A. O. ABBOTT, Jr.
WINDSHIELD FOR VEHICLE WHEELS.
APPLICATION FILED MAY 1, 1919.
1,359,647.    Patented Nov. 23, 1920.
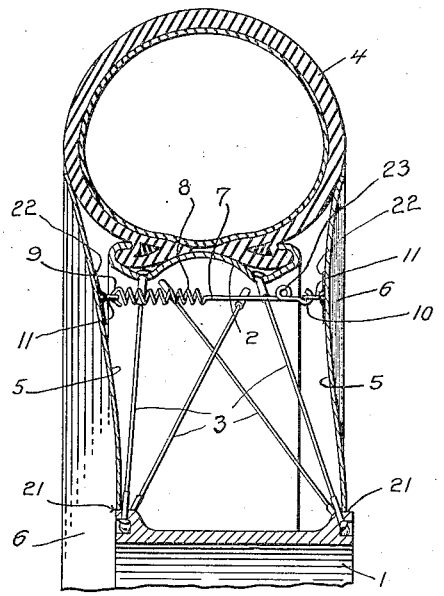
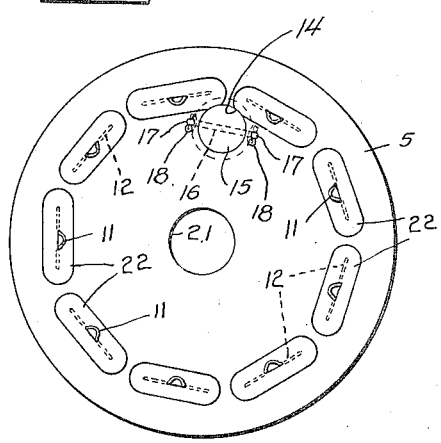
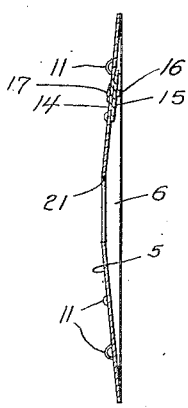
Inventor,
Adrian O. Abbott Jr.
By his Attorney.
Ernest Hopkinson

UNITED STATES PATENT OFFICE.

ADRIAN O. ABBOTT, JR., OF DETROIT, MICHIGAN, ASSIGNOR TO MORGAN & WRIGHT, A CORPORATION OF MICHIGAN.

WINDSHIELD FOR VEHICLE-WHEELS.

1,359,647.           Specification of Letters Patent.        Patented Nov. 23, 1920.

Application filed May 1, 1919. Serial No. 293,937.

*To all whom it may concern:*

Be it known that I, ADRIAN O. ABBOTT, Jr., a citizen of the United States, residing at Detroit, county of Wayne, and State of Michigan, have invented certain new and useful Improvements in Windshields for Vehicle-Wheels, of which the following is a full, clear, and exact description.

This invention relates to vehicle wheels, and more particularly to wheels for automotive vehicles operating at high speeds, which require the provision of devices known as "stream-lines" or wind shields, to obviate the retarding effect due to impingement of the air upon the hub, spokes, rim and other parts of the wheel structure. My invention is of special utility when embodied in the construction of wind-shields for use upon the large pneumatic-tired wheels employed upon airplanes, although I contemplate its employment in any field for which my improvements may be adapted by their nature.

Engineers have determined that the speed of an airplane can be increased as much as ten miles an hour by fitting such streamlines to the wheels, extending radially outward from the hub, on each side, preferably to the region of extreme protuberance of the tire contour, inasmuch as the extension of the tire beyond the streamline even an inch or so has been found to diminish seriously the advantages of such devices when the periphery of the latter was terminated at the rim.

An object of primary importance in my invention is to provide a device of the character described, in two parts, with means by which to effect their retention, securely embracing the wheel, and extending to the region of maximum advantage, without requiring special attachments upon the tire proper, which is highly undesirable from a manufacturing standpoint, and in practice is unsatisfactory, but has heretofore been adopted for want of attaching devices that would hold the perimeter of the shields snugly in place and prevent the sudden eddy effects due to their temporary displacement.

Another important object is to provide such wind-shields with self-contained attaching devices, coöperating to secure the shield members together under tension, regardless of the type of wheel or make of tire employed, and also to construct the shields and attaching devices in such fashion as to permit ready access to the attaching devices, for emplacement and removal.

Still other objects comprise the adoption of an inexpensive material and simple structure both for the shields and their attachments, rendering them capable of operation without the need for tools other than those at hand in every mechanician's kit, and for this purpose to construct the shields in such a way as to make possible the use of any light, relatively stiff material, such as a disk of hard vulcanized rubber, fiber board, etc., rather than treated or waterproof cloth, the attachments preferably taking the form of springs running directly from one disk to the other, and anchored to the disks by staples secured to the inner faces of the disks by attaching means of ample area and in sufficient quantity to leave no cranny around the perimeter for access of the wind; the outer surface of my improved disks being wholly free from projections or attachments.

The use of a relatively stiff material is advantageous by reason of the facility with which it may be standardized in sizes and shapes, permitting an accurate fitting in place quickly, and wind-shields thus constructed are more durable, less easily deformed and present a more attractive appearance, while their stream-line contour is more effective in diminishing wind resistance than the rather flat surfaces of existing wind-shields.

The various features of my invention will be illustrated and described fully in the accompanying drawings and specification and pointed out in the claims.

In the drawings,

Figure 1 is a view in vertical section of a portion of an air-plane wheel fitted with a pneumatic tire and streamlines or wind shields in the construction of which my invention has been embodied;

Figs. 2 and 3 are views on a smaller scale, in rear elevation and vertical medial section respectively, of one of the wind-shield members shown in Fig. 1.

Fig. 4 is a view in perspective of a simple form of tool capable of operating the connecting devices of the coöperating windshields to effect their attachment to the wheel.

In the embodiment of my invention selected for illustration and description to permit ready and complete understanding of my improvements, the part designated by the reference numeral 1 is the hub of an airplane wheel, having a rim 2 supported by spokes 3 and fitted with a pneumatic tire 4, all of which parts may be of any suitable construction, and are herein shown as of a well-known type that does not require further description.

In accordance with my invention, I have provided this wheel with a pair of "stream-lines" or wind shield disks 5, preferably symmetrical in shape and identical in structure, of which one is shown separately in rear elevation in Fig. 2, and in vertical section in Fig. 3, so that a description of it will suffice for both.

Any suitable material may be utilized, and the contour and general structure may be varied considerably within the scope of my invention. As one convenient material, I prefer to use a disk of fiber or similar material of inexpensive composition, finished smoothly on the outer face 6, to minimize wind resistance, and preferably of sufficient rigidity to prevent accidental deformation while in use or when demounted, but yielding enough to conform readily to the stream-line shape illustrated in Fig. 1, fitting snugly at 21 around the hub 1, and extending thence radially in a gentle concavity to the region of greatest lateral protuberance of the tire 4, where it is of the greatest importance that each shield edge should be held unyieldingly, and in close contact with the tire around the entire perimeter, to exclude the possibility of displacement by ingress of air at any point in the region of contact between the shield and tire.

Any suitable attaching means may be adopted to effect this object, and as one convenient form of construction I have shown a series of members 7, having medial spring portions 8, and formed at each end into attaching hooks 9 and 10, adapted respectively to be engaged with the eyes 11 of staples 12 forming part of the permanent structure of the disks, to which they are shown as secured by flat strips 22, fastened adhesively to the inner face of the disk in sufficient numbers to provide a very sure attachment.

If desired, the members 7 may have their hooks at one end respectively, as at 9, closed into the eyes 11 of the staples, to avoid accidental displacement when the disks are demounted, the hooks 10 being preferably left open to permit ready attachment and detachment, for which the simplest form of tool will suffice, such as the long hook 13 shown in Fig. 4.

In order to permit access to the valve of the tire, an aperture 14 may be provided in one or both of the disks, preferably near the rim and preferably closed by an auxiliary disk 15. For securing the auxiliary disk in place, I have shown a strap or bail 16 having projections 17, fitted with cotter pins 18.

In operation, the disks 5 are applied to the wheel, one from each side, with the smooth surfaces presented outward, the members 7 being in place upon one of the disks, or several upon each disk, as may be found most convenient, and one or more of the members may be extended between the spokes 3 and hooked manually at 10 to the eyes 11 of the staples on the opposite disk, to secure the disks loosely in place before it becomes necessary to use the tool 13. The tool 13 is then inserted between the perimeter of the disk and the side wall of the tire to engage the remaining hooks 10 with the eyes 11, the hook 19 of the tool 13 being inserted into auxiliary eyes 23 provided for that purpose on the shanks of the members 7 respectively.

Having illustrated and described my invention thus fully, and suitable means by which the same may be carried into effect, it is to be understood that I do not limit myself to the specific materials and structural forms selected for illustration and description by way of example, nor in general do I limit myself otherwise than as set forth in the claims read in connection with this specification.

What I claim and desire to protect by Letters Patent of the United States of America is:

1. A wind shield for pneumatic tired vehicle wheels, comprising a stiff, circular disk having its outer periphery adapted to closely contact with the side wall of the pneumatic tire and means for securing the disk to hold said periphery in pressed engagement with the said wall.

2. A wind shield for pneumatic tired vehicle wheels, comprising a stiff, circular disk having its outer periphery adapted to closely contact with the side wall of the pneumatic tire and means for securing the disk in spring pressed engagement with said wall.

3. In combination, a vehicle wheel having a pneumatic tire, a stiff, circular disk having its periphery adapted to closely contact with the side wall of the pneumatic tire, and means independent of the tire for holding the disk in spring pressed engagement with said wall.

4. The combination with a vehicle wheel and a pneumatic tire mounted thereon, of a relatively stiff wind-shield comprising a disk having its central portion engaged with the hub of said wheel, and extending therefrom radially in stream-line contour to engage the side wall of the tire.

5. The combination with a vehicle wheel and a pneumatic tire mounted thereon, of a relatively stiff wind-shield comprising a plurality of stream-line disks inclosing the spokes and respectively extending from seats on the hub to engage the side wall of the tire, and attaching means intermediate said disks.

6. The combination with a vehicle wheel, of a wind-shield comprising a plurality of stream-line disks inclosing the spokes and respectively extending from seats on the hub to engage the side wall of the tire, and attaching means intermediate said disks, and confined therebetween.

7. A wind-shield for wheels with pneumatic tires mounted thereon comprising a plurality of stiff disks having unbroken outer surfaces and of a diameter to engage with the sides of the tire, and means independent of the tire and wheel for holding the margins of the disks against the sides of said tire.

8. A wind-shield for wheels with pneumatic tires mounted thereon comprising a plurality of stiff disks having unbroken outer surfaces, and means for holding said disks with their margins engaging opposite sides of the tire including anchoring devices on the inside of each of said disks, and a tension member having its opposite ends connected to said anchoring devices.

9. Wind-shields for vehicle wheels, comprising a plurality of fiber disks having their inner faces provided with attaching means, and respectively presenting unbroken outer surfaces.

10. Wind-shields for vehicle wheels comprising disks having their inner faces each provided with one element of a hook and eye connection, and resilient means having each of its opposite ends provided with the other element of a hook and eye connection whereby the disks may be mounted on the wheel with their attaching means within the space between them.

11. A wind-shield for vehicle wheels, comprising a disk having one face provided with attaching staples, its other face presenting an unbroken surface.

12. A connecting member for vehicle wheel wind-shields having disks provided with staples, said connecting member comprising an extended shank having terminal hooks and an intermediate portion formed into a tension spring.

13. A connecting member for vehicle wheel wind-shields having disks provided with staples, said connecting member comprising an extended shank having terminal hooks and an intermediate portion formed into a spring, and an eye to receive an operating tool.

14. A wind-shield for pneumatic tired vehicle wheels, comprising a plurality of disks provided with attaching staples respectively, a series of connecting spring hook devices secured permanently to one of said disks, and at least one disk having an aperture to permit access to the tire valve.

Signed at Detroit, county of Wayne, State of Michigan, this 19th day of April, 1919.

ADRIAN O. ABBOTT, Jr.